April 29, 1952 S. W. LONG 2,594,666
CLUTCH ASSEMBLY FOR DRAWWORKS
Filed April 13, 1949 2 SHEETS—SHEET 2
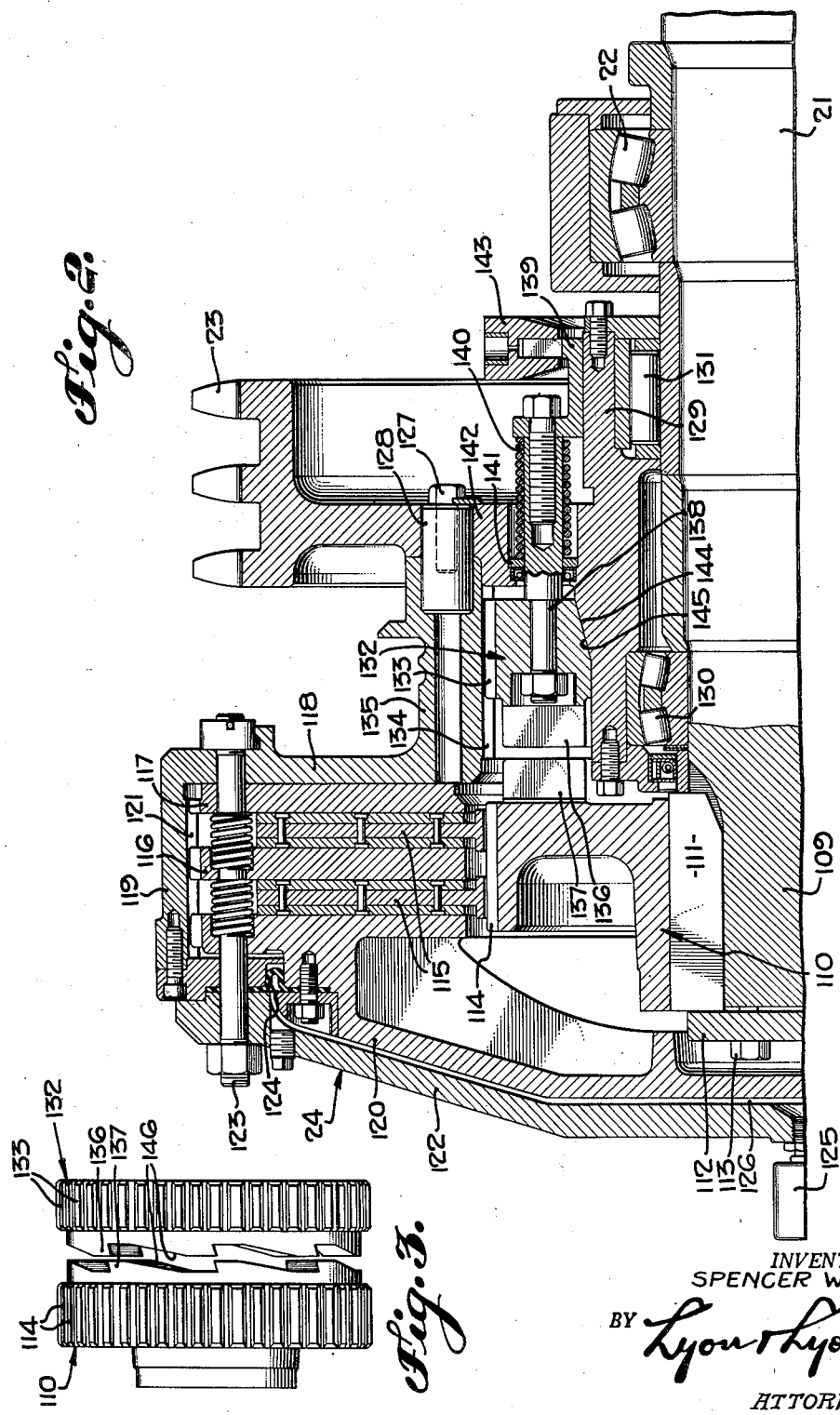
INVENTOR.
SPENCER W. LONG
BY Lyon & Lyon
ATTORNEYS Patented Apr. 29, 1952

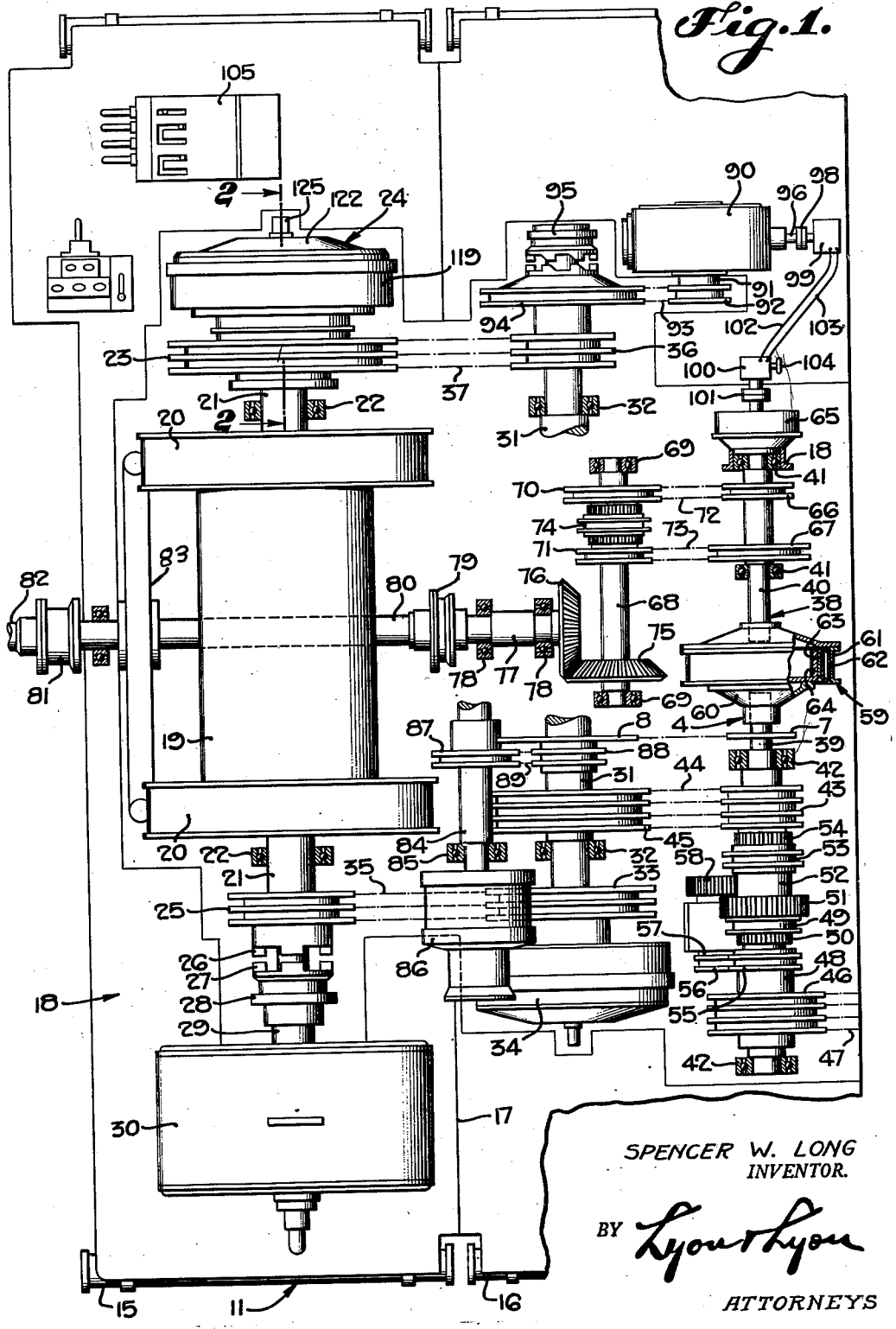

2,594,666

UNITED STATES PATENT OFFICE 2,594,666

CLUTCH ASSEMBLY FOR DRAWWORKS

Spencer W. Long, Inglewood, Calif., assignor to The National Supply Company, Pittsburgh, Pa., a corporation of Pennsylvania Application April 13, 1949, Serial No. 87,249

4 Claims. (Cl. 192—48)

This invention relates to drilling apparatus of the type employed in connection with the drilling of oil, gas, water and other wells, and is particularly directed to improvements in the drawworks employed in such drilling apparatus.

The principal object of my invention is to provide a new and improved form of clutch assembly for use in a rotary drawworks.

Another object is to provide a heavy-duty, high-capacity, friction clutch for a drawworks, the clutch being adapted for operation by fluid pressure, and provided with selectively operable positive drive means which is automatically released upon over-running of the driven member.

Another object is to provide a clutch assembly for driving a drawworks drumshaft, the assembly having friction drive means and positive drive means, the positive drive means being employed for controlling the rate of rotation of the spooling drum in a reverse direction.

A more detailed object is to provide a heavy-duty, high-capacity, friction drive clutch assembly for a drawworks and having releasable positive driving jaw members for establishing a positive driving connection when desired, one of the members being self-centering on a cone support in its inoperative position.

Further and more detailed objects and advantages will appear hereinafter.

In the drawings:

Figure 1 is a plan view partly in section and partly broken away showing a well drilling drawworks of the type used in connection with my invention.

Figure 2 is a sectional view of a preferred embodiment of my invention, the view being taken substantially on the lines 2—2 as shown in Figure 1, the lower half of the section being omitted.

Figure 3 is an elevation view showing clutch jaws employed in connection with my invention.

Referring to the drawings, the drawworks unit 11 includes a pair of skid frames 15 and 16 connected together along the juncture line 17. These skid frames, together with the supporting structure carried thereon, are hereinafter referred to as the drawworks frame 18. A spooling drum 19 provided with the usual brake rims 20 is fixed on a drumshaft 21. This drum shaft is supported on axially spaced bearings 22. These bearings, as well as other bearings hereinafter described, are supported by elements of the frame omitted in Figure 1 for purposes of clarity of illustration.

A low speed drive sprocket 23 is rotatably mounted on the drumshaft 21 and is adapted to be connected in driving relationship with the drumshaft 21 by means of the air operated friction clutch 24 embodying my invention, and described hereinafter. The high speed drive sprocket 25 is fixed on the drumshaft 21 and is provided with jaws 26 for connection with mating jaws 27 on the clutch 28. The clutch 28 is splined to the brake shaft 29 for operating the auxiliary brake 30. A line shaft 31 rotatably supported in an axially spaced bearing 32 carried by the frame 18, is provided with a high speed drive sprocket 33 rotatably mounted on the line shaft and arranged to be connected in driving relation therewith by means of an air operated friction clutch assembly 34. The sprocket 33 is adapted to drive the sprocket 25 by means of the drive chain 35. A low speed drive sprocket 36 is fixed on the line shaft 31 and is arranged to drive the sprocket 23 through the drive chain 37.

A jackshaft assembly generally designated 38 includes a pair of aligned jackshaft sections 39 and 40 rotatably supported in axially spaced bearings 41 and 42. These bearings are carried by the drawworks frame 18. A driving sprocket 43, rotatably mounted on the jackshaft section 39, is connected by a chain 44 to drive the sprocket 45 fixed to the line shaft 31. Means are provided for driving the jackshaft section 39, and as shown on the drawings this means includes a power receiving sprocket 46 driven by a chain 47. The sprocket 46 is fixed to a sleeve 48 rotatably mounted on the jackshaft section 39. An axially shiftable clutch 49 is provided with splined teeth 50 on one end and a gear 51 on the other end. The member 49 may be shifted to engage the splined teeth 50 with similar splined teeth (not shown) within the sleeve 48, thereby connecting the sleeve 48 in driving relationship with the sleeve 52. The sleeve 52 is rotatably mounted on the jackshaft section 39.

A splined clutch 53 may be shifted axially of the sleeve 52 to connect its inner splined teeth (not shown) with the splined ring 54 fixed on the sprocket 43. Thus, the sprocket may be driven in a forward direction and the splined clutch 53 engages the splined ring 54 when the splined clutch 49 engages the sleeve 48.

A reverse drive is provided for rotating the jackshaft section 39 in a reverse direction when required. This reverse drive includes a double sprocket 55 fixed on the sleeve 48 and connected by chain to drive the sprocket 56 fixed on the countershaft sleeve 57. The countershaft sleeve 57 is mounted on suitable bearings (not shown) and is provided with a driving gear 58 fixed thereon. The countershaft sleeve 57 is constantly rotated with the power-receiving sprocket 40, but it merely idles under normal driving conditions. When a reverse drive is required the clutch 49 is moved axially to place the gears 51 and 58 into mesh, thereby disengaging the splined teeth 50. The sleeve 52 is then driven in a reverse direction, and upon closing of the splined clutch 53 the sprocket 43 and jackshaft section 39 are rotated in a reverse direction.

An air operated friction clutch assembly generally designated 59 is provided for connecting the adjacent ends of jackshaft sections 39 and 40. This clutch assembly 59 includes a ring 60 fixed to the jackshaft section 39 and a housing 61 fixed to the jackshaft section 40. An inflatable rubber-like ring 62 on the housing 61 carries friction shoes 63 adapted to contact the periphery of the drum 64 formed on the ring 60. From this description it will be understood that inflation of the annular ring 62 serves to effect a driving engagement whereby the jackshaft assembly 40 is driven from the jackshaft section 39. When the inflatable ring 62 is deflated the shoes 63 move out of engagement with the drum 64, with the result that the driving connection is interrupted. An inertia brake assembly 65 may be provided for holding the jackshaft section 40 from rotation when desired.

Means are provided on the jackshaft section 40 for driving a rotary machine (not shown) at a plurality of speeds. As shown in the drawings, this means includes a pair of driving sprockets 66 and 67, which are fixed on the jackshaft assembly 40. A countershaft 68 rotatably supports the axially spaced bearing 69 carrying a pair of sprockets 70 and 71 connected by chains 72 and 73 to be driven from sprockets 66 and 67 respectively. The driven sprockets 70 and 71 are rotatably mounted on the countershaft 68 and either may be connected in driving relationship with the countershaft 68 by means of the axially shiftable clutch 74. From this description it will be understood that the countershaft 68 may be driven at either of two speeds with respect to the jackshaft section 40.

A beveled gear 75 fixed on the countershaft 68 drives a similar beveled gear 76 fixed on the stub shaft 77, which is carried on bearing 78. A self-aligned coupling 79 connects one end of the power transmission shaft 80 to the stub shaft 77 and a second self-aligning coupling 81 connects the other end of the transmission shaft 80 to the power transmission shaft 82. This latter shaft 82 extends under a guard 83 and is connected to rotate the drive shaft of the rotary machine (not shown).

A catshaft 84 is rotatably connected in axially spaced bearings 85 carried on the drawworks frame 18. This catshaft may be provided with a cathead assembly 86 on each end thereof as shown in Figure 1. The catshaft is provided with a driven sprocket 87 fixed thereon arranged to be driven from driving sprocket 88 rotatably mounted on the line shaft 31. A chain 89 connects the sprockets 87 and 88. A sprocket 7 fixed on the jackshaft section 39 drives the sprocket 8 which is fixed to the sprocket 88.

In conventiontal drilling rigs the cable which is wound on the spooling drum 19 is paid out gradually in order to feed the drill string and bit into the formation. This feed-off operation is accomplished conventionally by relaxing the brake bands (not shown) which are trained over the brake rims 20. The feed-off accomplished by relaxation of the brake bands is irregular and intermittent, and it is known that it does not act to maintain constant feeding pressure on the drill bit.

In order to overcome this difficulty, there is provided a speed reduction unit 90 which may include a single or double worm gear reduction. The slow speed shaft 91 of this unit 90 is connected by means of sprocket 92 and chain 93 to the sprocket 94 which is rotatably mounted on one end of the line shaft 31. A jaw clutch 95 is provided for releasably connecting the sprocket 94 in direct driving relationship with the line shaft 31. The high speed shaft 96 on the unit 90 is connected by coupling 98 to a hydraulic motor 99. A hydraulic pump 100 is connected by coupling 101 in direct driving relationship with the jackshaft section 40. Hydraulic lines 102 and 103 connect the hydraulic motor 99 with the hydraulic pump 100 so that the pump may drive the motor. A suitable control device 104 of conventional type is operatively positioned in the lines 102 and 103 or associated with the pump 100 for regulating the volume of flow of hydraulic fluid between the pump 100 and motor 99.

From this description it wil be understood that the rotating jackshaft section 40 may drive the pump 100 which in turn drives the hydraulic motor 99. The motor 99 drives the shaft 96 at a relatively high speed, and the output shaft 91 turns at a very much slower speed. This slow speed drive is then communicated via sprockets 92, 94, 36 and 23 to turn the spooling drum 19 very slowly in a direction to pay off or to unspool the cable for feeding the drill string. The control 104 may have remote actuating mechanism positioned at the driller's control panel 105 if desired. This control 104 may be set by the driller to provide a fixed rate of flow in the lines 102 and 103 so that regardless of the speed of the jackshaft section 40 the pump 99 turns the shaft 96 at a rate to produce the desired rate of feed-off rotation for the spooling drum 19.

The provisions for supplying air to each of the air operated friction clutches and for supplying cooling water for the brake rims 20 of the drum 19 are largely omitted from the drawings for purposes of clarity of illustration. Similarly, the lubricating connections, fittings, piping, etc. which convey lubricants to the various bearings of the device are also omitted from the drawings.

In accordance with my invention a hub 110 is fixed on a tapered end 109 of the drumshaft 21. A key 111 prevents relative rotation. A plate 112 is secured to the shaft end by means of cap screws 113 and serves to hold the hub 110 in position on the tapered shaft end. External splines 114 are provided on the outer periphery of the hub, and these splines are engaged by the internal splines formed on the inner diameter of the annular friction disks 115. A first friction plate 116 is positioned between the disks 115 and a second friction plate 117 is positioned adjacent the stationary wall 118 of the clutch housing or shell 119. A piston 120 engages one of the disks 115 and is mounted for axial movement within the shell 119. The piston 120 and plates 116 and 117 are each provided with external splines which are received by the internal splines 121 provided within the shell 119. A cover 122 which encompasses the end of the drumshaft 21 is connected to the shell 119 by means of the through bolts 123. The piston 120 is sealed with respect to the shell and cover by means of a flexible diaphragm 124. A rotary stuffing box assembly 125 carried by the cover 122 at a location on the center line of the drumshaft 21 serves to introduce fluid pressure into the space 126 between the piston 120 and the cover 122. From this description it will be understood that the shell 119 is placed in driving relationship with the hub 110 when air pressure is admitted into the space 126 to bring the friction disks 115 into engagement with the piston 120 and friction plates 116 and 117.

The driving sprocket 23 is connected to the shell 119 of the clutch 24. As shown in the drawings this connection includes a plurality of threaded elements 127 and a plurality of pins 128 which transmit the torque. The driving sprocket 23 is provided with an elongated annular hub section 129 mounted on axially spaced bearings 130 and 131.

In accordance with my invention I provide an annular clutch ring 132 which is carried on the sprocket member 23. This clutch ring 132 encircles a portion of the elongated hub section 129 and is provided with splines 133 on its outer periphery. These splines engage within internal splines 134 provided within the bore of the cylindrical section 135 of the shell 119. Bevel clutch jaws 136 are provided on the clutch ring 132 and a companion set of bevel clutch jaws 137 are mounted on a side face of the hub 110. A plurality of axially extending pins 138 are attached to the clutch ring 132 at one end and are attached to a shifter collar 139 at the other end. A compression spring 140 encircles each of the pins 138. One end of each spring engages the shifter collar 139 and the other end engages a washer 141 fixed within the web 142 of the sprocket member 23. It will be understood that each of the pins 138 extends through the web 142. A non-rotary ring 143 may be axially shifted by any suitable fork device (not shown) to move the shifter collar 139 to the left as viewed in Figure 2. This moves the pins 138 and brings the bevel jaws 136 of the clutch ring 132 into driving engagement with the companion jaws 137 carried on the hub 110. Engagement of the jaws 136 and 137 establishes a positive driving connection between the sprocket member 23 and the drumshaft 21. This is a valuable feature for it enables the drumshaft 21 to be turned even in the event of failure of air supply for actuating the high capacity friction clutch 24.

The clutch ring 132 may be moved back to the inoperative position shown by applying a force to the nonrotary ring 143, if desired. The clutch ring 132 is provided with a conical bore 144 which seats on the conical surface 145 provided on the hub section 129 of the sprocket 23. The spring 140 maintains the conical surfaces 144 and 145 in engagement so that the clutch ring 132 in its inoperative position is held in a central position so that it does not vibrate or chatter and so that it does not cause wear on the interengaging splines 133 and 134.

The clutch ring 132 has an important function with the feed-off device above described. When the drum 19 is unspooling line while the drill string is being rotated the clutch ring 132 is moved to its operative engaged position to connect the drumshaft 21 in positive driving relationship with the sprocket 23. During the long periods of drilling it is unnecessary to introduce air into the space 126 for clamping the friction disks 115. When it is desired to raise the drill string after an interval of drilling with the bit on bottom the air operated friction clutch 34 on the line shaft 31 is engaged to bring the high speed drive through sprocket 25 into play, thereby rotating the drum 19 in a forward direction to wind up the cable thereon and thereby raise the drill string off bottom. When the high speed drive through sprockets 33 and 25 rotates the drumshaft 21, the hub 110 over-runs the clutch ring 132 with the result that the beveled surfaces 146 on the clutch ring 132 and hub 110 automatically disengage the jaws 136 and 137 so that the springs 140 may move the clutch 132 back to its inoperative position. It is therefore to be understood that the high speed drive through sprocket 25 may be brought into play at any time while the feed-off device is in operation without first requiring that the low speed clutch be first disengaged.

Certain features of the construction shown in Figure 1 of the drawings are the subject of the copending application of John B. Picard for "Rotary Drilling Rig," filed April 12, 1949, and bearing Serial No. 86,875.

Having fully described my invention, it is to be understood that I do not wish to be limited to the details herein set forth, but my invention is of the full scope of the appended claims.

I claim:

1. In a device of the class described, the combination of a shaft, a hub fixed on the shaft and provided with an annular series of external spline teeth, a power transmitting member rotatably mounted on the shaft and having a radial wall and an axially extending shell encircling the hub, a sprocket fixed to said member, a friction disk carried by said hub within said shell and having internal splines cooperating with the spline teeth on the hub, a movable element carried on the member and adapted to clamp the friction disk between the element and said radial wall whereby a friction driving connection is established between the member and the hub, fluid pressure means for actuating said element, mechanical means for effecting a positive driving engagement between said member and the hub, said means including an axially slidable clutch ring splined on said member, cooperating conical surfaces on the clutch ring and said member forming a seat for the clutch ring in its inoperative position, and cooperating bevel clutch jaws on the clutch ring and hub adapted to be engaged through axial movement of the clutch ring, the bevel jaws being disengaged when the hub over-runs the power-transmitting member.

2. In a device of the class described, the combination of a shaft, a hub fixed on the shaft and provided with an annular series of external spline teeth, a power transmitting member rotatably mounted on the shaft and having a radial wall and an axially extending shell encircling the hub, a sprocket fixed to said member, a friction disk carried by said hub within said shell and having internal splines cooperating with the spline teeth on the hub, a movable element carried on the member and adapted to clamp the friction disk between the element and said radial wall whereby a friction driving connection is established between the member and the hub, fluid pressure means for actuating said element, mechanical means for effecting a positive driving engagement between said member and the hub, said means including an axially slidable clutch ring splined on said member, cooperating conical surfaces on the clutch ring and said member forming a seat for the clutch ring in its inoperative position, resilient means acting to move the clutch ring toward said seat, and cooperating bevel clutch jaws on the clutch ring and hub adapted to be engaged through axial movement of the clutch ring, the bevel jaws being disengaged when the hub overruns the power-transmitting member.

3. In a device of the class described, having a shaft rotatably mounted upon spaced bearings and an overhanging end of the shaft extending beyond one of the bearings, the combination of a hub member fixed on the overhanging portion of the shaft, a pair of spaced roller bearings supported on said shaft between the hub member and the shaft bearing, a power-transmitting member mounted on said spaced roller bearings for rotation relative to the shaft, releasable mechanical means for effecting a positive driving engagement between said members, said means including an axially slidable clutch ring carried on one of said members and splined to rotate therewith, axially engageable bevel jaws on the clutch ring and the other member whereby the clutch ring may drive the member and whereby overrunning of the member with respect to the clutch ring automatically moves the clutch ring axially to disengage the jaws, cooperating conical surfaces on the clutch ring and said member forming a seat for the clutch ring in its disengaged position, a pair of friction disks encircling the hub member and each splined to one of said members, and fluid actuated means adapted to bring said disks into frictional engagement with each other to establish a frictional driving connection between said members.

4. In a device of the class described, having a shaft rotatably mounted upon spaced bearings and an overhanging end of the shaft extending beyond one of the bearings, the combination of a hub member fixed on the overhanging portion of the shaft, a pair of spaced roller bearings supported on said shaft between the hub member and the shaft bearing, a power-transmitting member mounted on said spaced roller bearings for rotation relative to the shaft, releasable mechanical means for effecting a positive driving engagement between said members, said means including an axially slidable clutch ring carried on one of said members and splined to rotate therewith, axially engageable bevel jaws on the clutch ring and the other member whereby the clutch ring may drive the member and whereby overrunning of the member with respect to the clutch ring automatically moves the clutch ring axially to disengage the jaws, cooperating conical surfaces on the clutch ring and said member forming a seat for the clutch ring in its disengaged position, a pair of friction disks encircling the hub member and each splined to one of said members, means adapted to bring said disks into frictional engagement with each other to establish a frictional driving connection between said members, said means including a fluid actuated piston supported by the power-transmitting member and encompassing the end of the shaft.

SPENCER W. LONG.

REFERENCES CITED

The following references are of record in the file of this patent:

UNITED STATES PATENTS

| Number | Name | Date |
|---|---|---|
| Re. 18,947 | Greve | Sept. 12, 1933 |
| 1,794,613 | Heany | Mar. 3, 1931 |
| 2,161,075 | Morgan | June 6, 1939 |
| 2,360,489 | Gillett | Oct. 17, 1944 |